US010543752B2

(12) United States Patent
Moravick et al.

(10) Patent No.: US 10,543,752 B2
(45) Date of Patent: Jan. 28, 2020

(54) LIGHT ELECTRIC VEHICLE RIDE SHARE SYSTEM AND METHOD

(71) Applicant: Swiftmile, Inc., San Mateo, CA (US)

(72) Inventors: Keith Edward Moravick, Mountain View, CA (US); Colin Aidan Roche, San Mateo, CA (US)

(73) Assignee: Swiftmile, Inc., Mountain View, CA (US)

( * ) Notice: Subject to any disclaimer, the term of this patent is extended or adjusted under 35 U.S.C. 154(b) by 424 days.

(21) Appl. No.: 15/136,857

(22) Filed: Apr. 22, 2016

(65) Prior Publication Data

US 2016/0311334 A1    Oct. 27, 2016

Related U.S. Application Data

(60) Provisional application No. 62/151,191, filed on Apr. 22, 2015, provisional application No. 62/153,305, filed on Apr. 27, 2015.

(51) Int. Cl.
*H01M 10/44* (2006.01)
*B60L 11/18* (2006.01)
(Continued)

(52) U.S. Cl.
CPC .......... *B60L 11/1825* (2013.01); *B60L 53/14* (2019.02); *B60L 53/305* (2019.02); *B60L 53/31* (2019.02);
(Continued)

(58) Field of Classification Search
CPC ....................................................... H02J 7/35
(Continued)

(56) References Cited

U.S. PATENT DOCUMENTS 5,841,351 A    11/1998 Rey
5,917,407 A    6/1999 Squire et al.
(Continued)

FOREIGN PATENT DOCUMENTS

EP    2 261 108 A2    12/2010

OTHER PUBLICATIONS http://www.zipcar.com/; Zipcar company website; last viewed Sep. 29, 2016.
(Continued)

*Primary Examiner* — Yalkew Fantu
(74) *Attorney, Agent, or Firm* — Keith Kline; The Kline Law Firm PC (57) ABSTRACT

Methods and systems are described for operating an interconnected network of autonomous battery powered electric vehicle (BEV) charging stations that maintain fully charged BEVs, for real-time self-guided exchange or rental with little down-time to a user. By locking or otherwise disabling low charge or uncharged vehicles until the vehicle charging is complete, users are assured they are getting a vehicle that has enough charge to get them to their destination. The user can view all available vehicles and their locations using a wireless mobile device on the system network and, with appropriate permissions, reserve and unlock any available vehicle via wireless networking. The locations in a ride share system of docking hubs with electrical power for re-charging BEVs is determined by the commute needs (particularly last mile commute needs) of users of the ride share system as they subscribe to the ride share program which utilizes the system.

11 Claims, 10 Drawing Sheets

(51) Int. Cl.
*B62H 3/00* (2006.01)
*B60L 53/31* (2019.01)
*B60L 53/14* (2019.01)
*B60L 58/12* (2019.01)
*B60L 53/30* (2019.01)
*H02J 7/35* (2006.01)
*H04W 4/40* (2018.01)

(52) U.S. Cl.
CPC ............... B60L 58/12 (2019.02); B62H 3/00 (2013.01); *B60L 2200/12* (2013.01); *B62H 2003/005* (2013.01); *H02J 7/35* (2013.01); *H04W 4/40* (2018.02); *Y02T 10/705* (2013.01); *Y02T 10/7005* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
USPC ........................................................ 320/101
See application file for complete search history.

(56) References Cited

U.S. PATENT DOCUMENTS

| | | |
|---|---|---|
| D600,201 S | 9/2009 | Dallaire |
| D626,493 S | 11/2010 | Dallaire et al. |
| D634,249 S | 3/2011 | Dallaire |
| 7,898,439 B2 * | 3/2011 | Bettez .................... B62H 3/00 340/999 |
| 8,061,499 B2 | 11/2011 | Khairallah et al. |
| D668,216 S | 10/2012 | Dallaire |
| 8,285,571 B2 * | 10/2012 | Demirdjian ........... G01S 13/825 705/319 |
| 8,536,993 B2 | 9/2013 | Ayotte et al. |
| 2009/0266673 A1 | 10/2009 | Dallaire et al. |
| 2010/0171603 A1 | 7/2010 | Dhawan et al. |
| 2010/0228405 A1 * | 9/2010 | Morgal ..................... B62H 3/02 701/2 |
| 2012/0196631 A1 * | 8/2012 | Fajstrup Axelsen ... G06Q 20/32 455/466 |
| 2013/0255336 A1 | 10/2013 | Desai et al. |
| 2013/0314205 A1 * | 11/2013 | Neupert .................... B62M 6/40 340/5.2 |
| 2014/0067660 A1 * | 3/2014 | Cornish ............... G06Q 20/145 705/39 |
| 2014/0265237 A1 * | 9/2014 | Strother .................. B62H 5/00 280/297 |
| 2014/0371962 A1 * | 12/2014 | Smith ................. B60L 11/1824 701/22 |
| 2014/0379124 A1 | 12/2014 | Dallaire |

OTHER PUBLICATIONS https://en.wikipedia.orq/wiki/Zipcar; wepage definition of Zipcar; last viewed Sep. 29, 2016.

https://www.uber.com; Uber company website; last viewed Sep. 29, 2016.

http://goo.gl/BymF89, Juggernaut company website, "How Uber Works: Insights into Business & Revenue Model," published Sep. 24, 2015; last viewed Sep. 29, 2016.

http://scoot.co/; Scoot company website; last viewed Sep. 29, 2016.

Fehrenbacher, Katie, "The Zipcar for Electric Scooters Grows Up and Out," web article published at Fortune.com; Jul. 9, 2015; available at http://fortune.com/2015/07/09/zipcar-for-electric-scooters/, last viewed Sep. 29, 2016.

http://bewegen.com/; Bewegen Technologies, Inc. website; last viewed Sep. 29, 2016.

www.swiftmile.com; Swiftmile, Inc. company website; last viewed Sep. 29, 2016.

* cited by examiner

LIGHT ELECTRIC VEHICLE RIDE SHARE SYSTEM AND METHOD

CROSS-REFERENCE TO RELATED APPLICATIONS

This application claims the benefit of U.S. Provisional Application No. 62/151,191 filed Apr. 22, 2015, and U.S. Provisional Application No. 62/153,305 filed Apr. 27, 2015, both incorporated by reference in their entirety herein.

FIELD OF THE INVENTION

The present invention relates generally to systems and methods for ride sharing light electric vehicles and to recharging stations used in such systems.

BACKGROUND

Commuters, travelers, and local residents alike are faced with transportation needs that have been unmet to this day. Short distance travels between transportation centers (such as bus, train, taxis, shuttle stations, etc.) and final destinations still have very few options outside of walking or driving. Additionally, government statistics show that short distance travels in the range 1 to 3 miles account for more than 50% of Urban and Suburban traffic on the road at any given time. The data further shows that 37.5% of road vehicles are actually driving 1 mile or less, which adds to the continuous roadway congestion experience for most of the 489 metropolitan areas in the United States. Public transportation systems do not extend to every street in a city or town, and doing so would only just add to the congestion problem. There is a need for a solution to urban and suburban traffic congestion which addresses the first and last mile commute problem.

Vehicle share programs, where people either share the use of their own or business vehicle or rent a vehicle from a rental company, are popular throughout the world, largely differing only in the type or model of vehicle in use. Traditional vehicle rental and ride share programs have been around for decades and all operate under the same basic model. This model uses centralized hubs, store fronts, and kiosks as locations where customers and users can travel to and rent a vehicle. To complete their rental transaction, the customer can either return the vehicle to the same location, or in many cases, to a remote satellite location. This system's methodology still requires users, in most cases, to travel to and from the point of pickup or return. Only in the largest of centralized transit hubs, such as airports, are rental vehicles, shuttles, buses, taxis and train connections available at the hub itself. In most cases, there are no direct public transit options to and from the pickup locations, making this rental model unsuitable for first and last mile transportation.

Furthermore, in the case of a standard car rental the process can be complicated, often requiring a separate shuttle to take the user to the "over-the-counter" rental hub. Recently, several new rental models have emerged which aim to address the growing "Share" economy and make use of new mobile app technology to streamline the rental process. In the new model, the central hub is replaced with individual cars located in regular parking lots and garages throughout a metropolitan or suburban area. This reduces the operating overhead cost and enables a cost model that is in line with other commute options. Vehicles are equipped with GPS tracking devices and their locations are indicated from within a mobile app. Users select and reserve a vehicle, but still need to get to the vehicle which may be several miles away. While this model of car rental simplifies the rental process over the current standard, the vehicles are still not accessible enough to address the first and last mile problem. Moreover, this vehicle rental/sharing method does nothing to address congestion due to overcrowded roadways as it only adds cars to existing automobile traffic. Additionally, renting a car requires the user be licensed locally to be in compliance with the law.

Direct route shuttles and buses are an alternative to renting cars for short distance travel and commuting. This solution is employed by many corporate campuses, business parks, universities, hotels, resorts, municipal and metropolitan transit authorities as well as governmental agencies to provide some level of direct short distance transportation to workers, students, and other travelers. Specifically, employers contract shuttle services to transport commuters from train and bus stations directly to company buildings. Companies continually alter shuttle routes within communities based on requests to optimize the first and last mile commute for their employees. Public transit agencies will often employ temporary bus bridges to handle added traffic due to special events. Direct route shuttles can be more effective than individual cars for curtailing traffic and individualizing first and last mile commutes, however these shuttles are still subject to the same traffic delays as all other vehicles on the road. Additionally, unless it is a door-to-door shuttle, users still need to get to the pickup location, which may be several blocks away. Once a user arrives at the shuttle pickup location, there is no guarantee that they will not have to wait for a delayed shuttle. Advances in mobile communication technology have enabled new versions of taxi and ride share services offering enhanced visibility into timing, delays, and traffic conditions. These platforms, while offering a convenient method for making ride reservations and adding ride alternatives to the standard public transportation or shuttle service offerings, at their core are no different to existing services, putting more cars on the local roads and adding to congestion.

SUMMARY OF THE INVENTION

Some embodiments of the present invention provide methods and systems for operating an interconnected network of autonomous battery powered electric vehicle (BEV) charging stations that maintain fully charged BEVs, and in embodiments more specifically Light Electric Vehicles (LEVs) such as electric bicycles, electric scooters and two-wheeled self-balancing battery-powered vehicles, for real-time self-guided exchange or rental with little down-time to a user. By locking or otherwise disabling low charge or uncharged vehicles until the vehicle charging is complete, users are assured they are getting a vehicle that has enough charge to get them to their destination. The user can view all available vehicles and their locations using a wireless mobile device on the system network and, with appropriate permissions, reserve and unlock any available vehicle via wireless networking. Some embodiments of the present invention enable users of BEVs to re-charge vehicles away from home or in embodiments in remote locations without distributed power. According to embodiments, the invention provides a locking system that can be used to ensure the vehicle will not be removed until sufficiently re-charged or the owner or user gives permission to do so.

According to some embodiments of the present invention the locations in a ride share system of docking hubs with electrical power for re-charging LEVs is determined by the commute needs (particularly last mile commute needs) of users of the ride share system as they subscribe to the ride share program which utilizes the system. Furthermore, some embodiments of the ride share systems and methods permit users to take ride share vehicles home and keep them at home overnight. In some embodiments the ride share system grows (and shrinks) by adding the same numbers of vehicles and charging stations as added users; the vehicles and charging stations are located at commute destinations, such as a workplace. Additionally, if a user has a multi-leg commute, a vehicle and station can be added for each leg of the commute making it a seamless end-to-end commute solution.

According to some embodiments, a recharging hub for battery electric vehicles (BEVs) may comprise: one or more recharging bays, wherein each of the bays is configured for securing and recharging one of the BEVs, each of the bays comprising: a BEV charging adaptor, configured to make electrical connection between a rechargeable battery of the one of the BEVs and an electrical power supply of the recharging station; and a smart lock housing for securing the one of the BEVs to the recharging station.

According to some embodiments, a ride share system for battery powered electric vehicles (BEVs) may comprise: a plurality of BEVs; a network server for managing an inventory of the plurality of BEVs, the inventory comprising location and battery charge levels for the plurality of BEVs; and a multiplicity of recharging hubs, each of the recharging hubs comprising one or more recharging bays, wherein each of the bays is configured for securing and recharging one of the plurality of BEVs; wherein one recharging bay per commuter is geographical located at each commuter's commute endpoint. Furthermore, the number of BEVs may correspond to the number of charging bays. Furthermore, the BEVs may be LEVs such as electric bicycles.

According to further embodiments, methods of operating the ride share systems and recharging hubs are described herein.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Advancements in technology have made many types of transportation available in battery powered electric vehicle (BEV) formats. The existing ride share and rental industry business models are not suited for the new BEV paradigm which will put more vehicles in circulation, each with shorter range than traditional vehicles and with more frequent planned out-of-service time per vehicle for re-charging. Furthermore, Light Electric Vehicles (LEVs), such as electric bicycles, electric scooters, two-wheeled self-balancing battery-powered vehicles (such as vehicles available from Segway Inc.), etc., have a limited range and require frequent re-charging because they make use of small, lightweight batteries. There is a need for recharging stations for users of these LEVs for recharging the LEV batteries when away from home, in remote locations, and in particular for recharging stations configured for use in "last mile commute" situations and vehicle share programs.

Barriers to mass adoption of LEVs, which provide a convenient mode of transport which can avoid and reduce congestion on highways, are: the length of time to charge the battery; the absence of large numbers of personal, shared or business operated charging hubs; and the required computerized system to manage the availability of the vehicles under charge. (It is noted that electric car charging systems are designed to use a high current charging cord and plug to charge a high capacity electric car battery. The batteries in LEVs are much smaller capacity batteries and there is a large discrepancy in the load that an electric vehicle recharging system is designed for and the much lower load charging system that is needed for LEV batteries.) Furthermore, a locking system that can be used to ensure the LEV will not be removed until re-charged or the owner or user gives permission to do so is seen by the inventors as a useful feature for enabling a system for sharing and/or recharging LEVs which has publicly accessible hubs.

Figure 1:
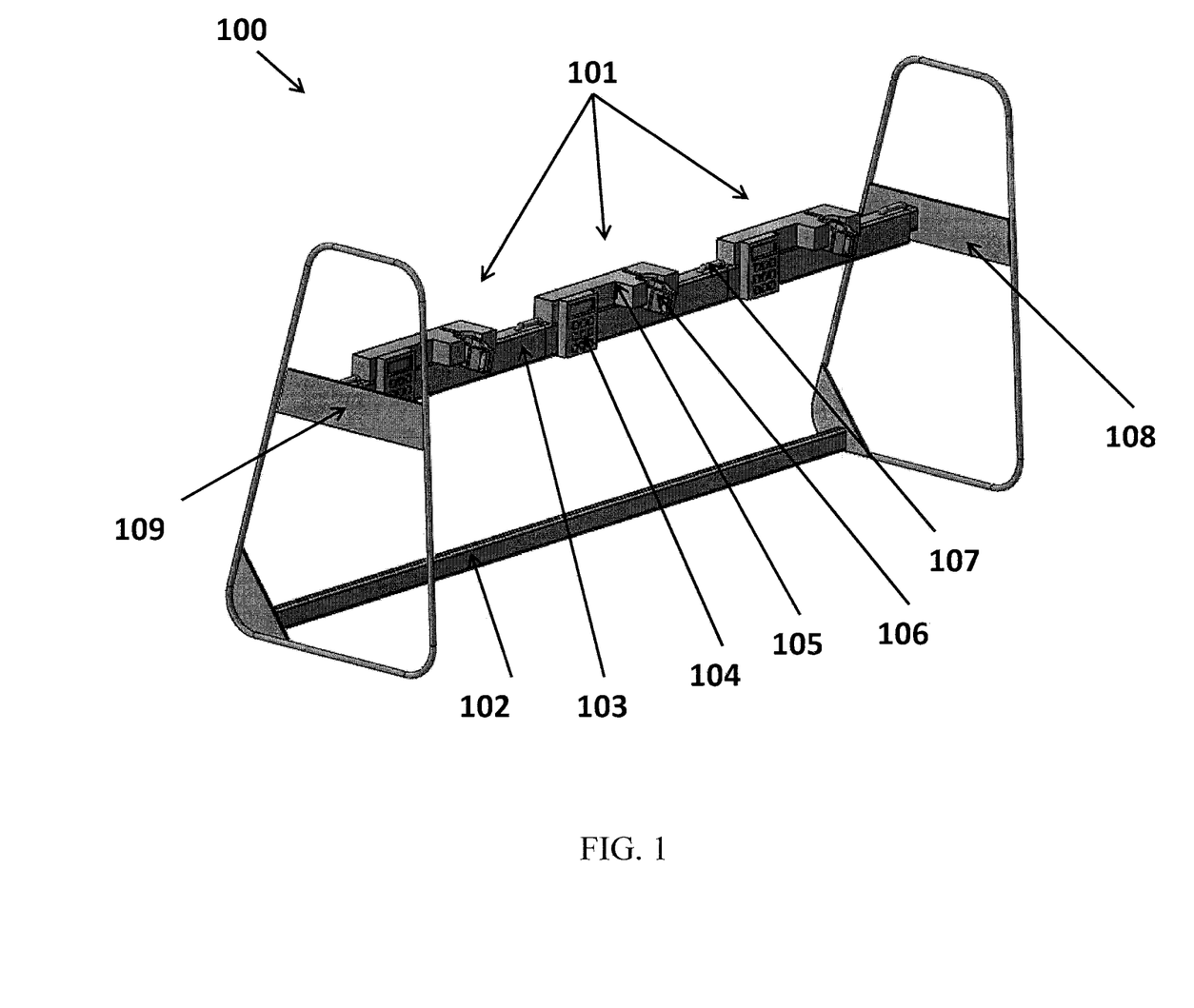
FIG. 1 shows a perspective view of a locking re-charging hub, according to some embodiments of the present invention.
Figure 2:
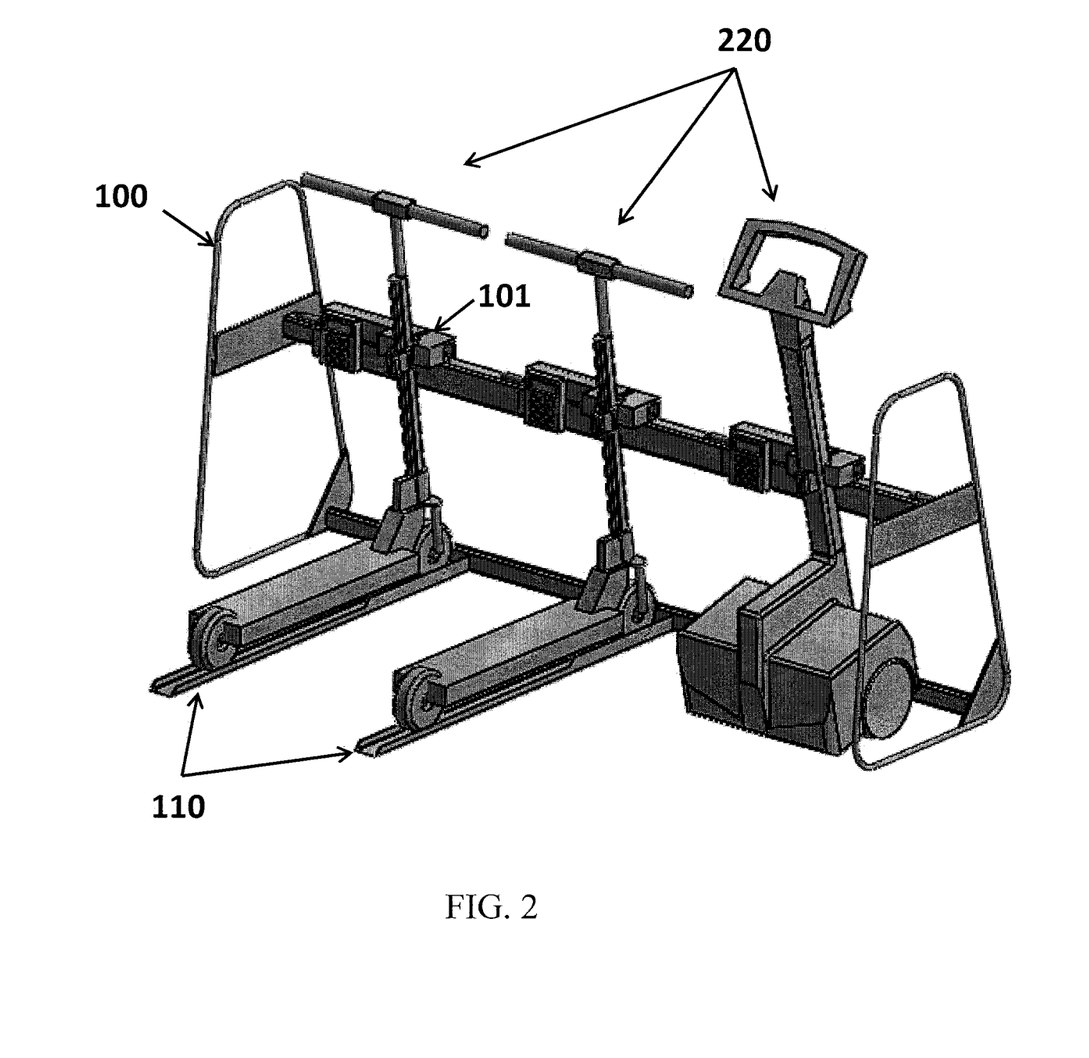
FIG. 2 shows a perspective view of a locking re-charging hub with different LEVs docked, according to some embodiments of the present invention.

According to some embodiments of the present invention, a hub for LEVs comprises a battery recharging connector which also secures the LEV during recharging or until an owner or user of the LEV gives permission for the LEV to be released. FIG. 1 shows a three bay Locking Universal Re-charging Hub (LURCH) 100 comprising three autonomous digital locking units 101, where each bay comprises, a modular structural member 103 (to which the locking hardware is attached), an electronic keypad 104 (in some cases used for manual system control), a smart lock housing 105 (for securing the LEV), and a vehicle charge adapter 106 (for making electrical connection to the LEV for recharging the battery; the vehicle charge adapter may be universal or in embodiments specific to a particular LEV). A modular locking pin 107 connects together multiple modular structural members in a row. Further structural members hold the row of digital locking units at a desired height in a stable configuration, these members comprising a cross support 102, a right end panel 108, and a left end panel 109, where the cross support and the row of digital locking units are attached at either end to the end panels. Located inside the modular structural member 103 are control electronics to manage wireless communications, digital electronic lock, and charging. Power is supplied to the system externally from either standard line power or power generated/stored locally—in embodiments generated/stored at the hub—such as solar, wind, batteries, and/or combustion generator. FIG. 2 shows LEVs 220 docked in a charging hub 100, wherein the hub also comprises LEV guide tracks 110; the LEVs are shown locked in position by digital locking units 101 while recharging/awaiting a user. The LEVs 220 shown are electric scooters and a two-wheeled self-balancing battery-powered vehicle, although other LEVs may be docked at the hub for recharging and securing until required by an owner/user.

Figure 3:
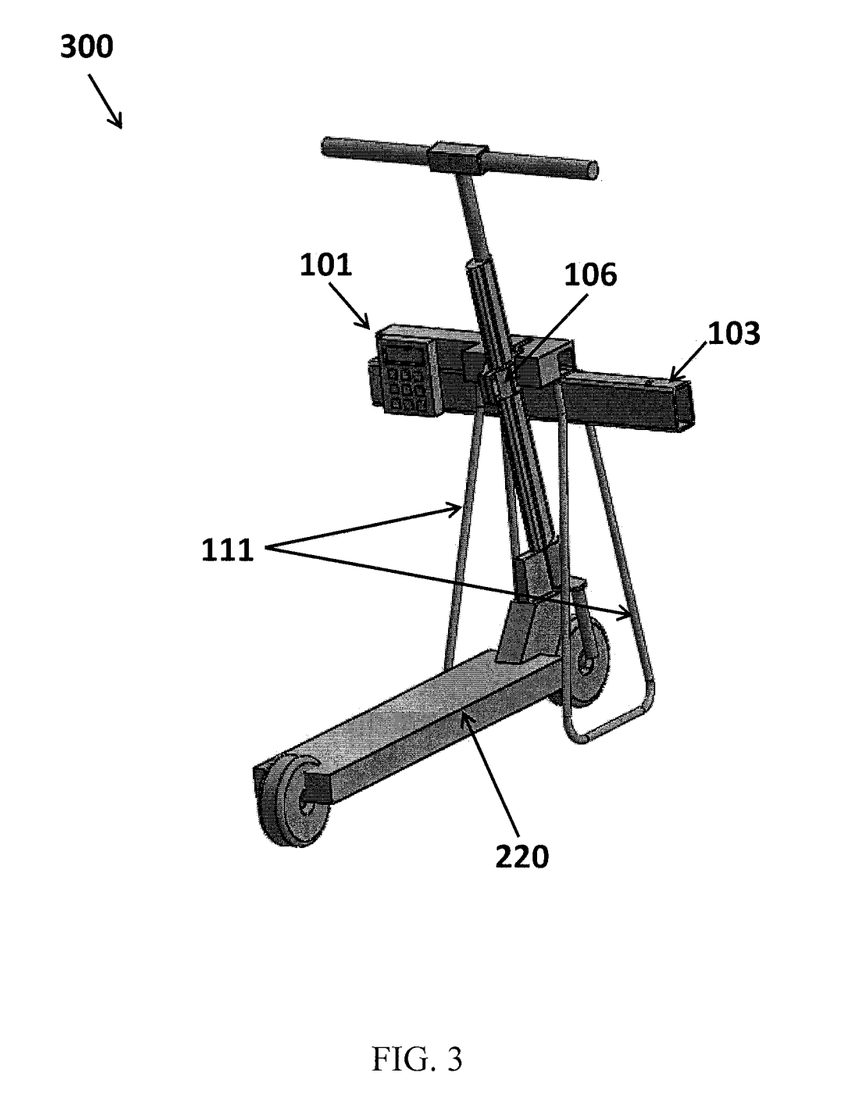
FIGS. 3 & 4 show perspective views of locking re-charging hubs configured for a single LEV, according to some embodiments of the present invention.
Figure 4:
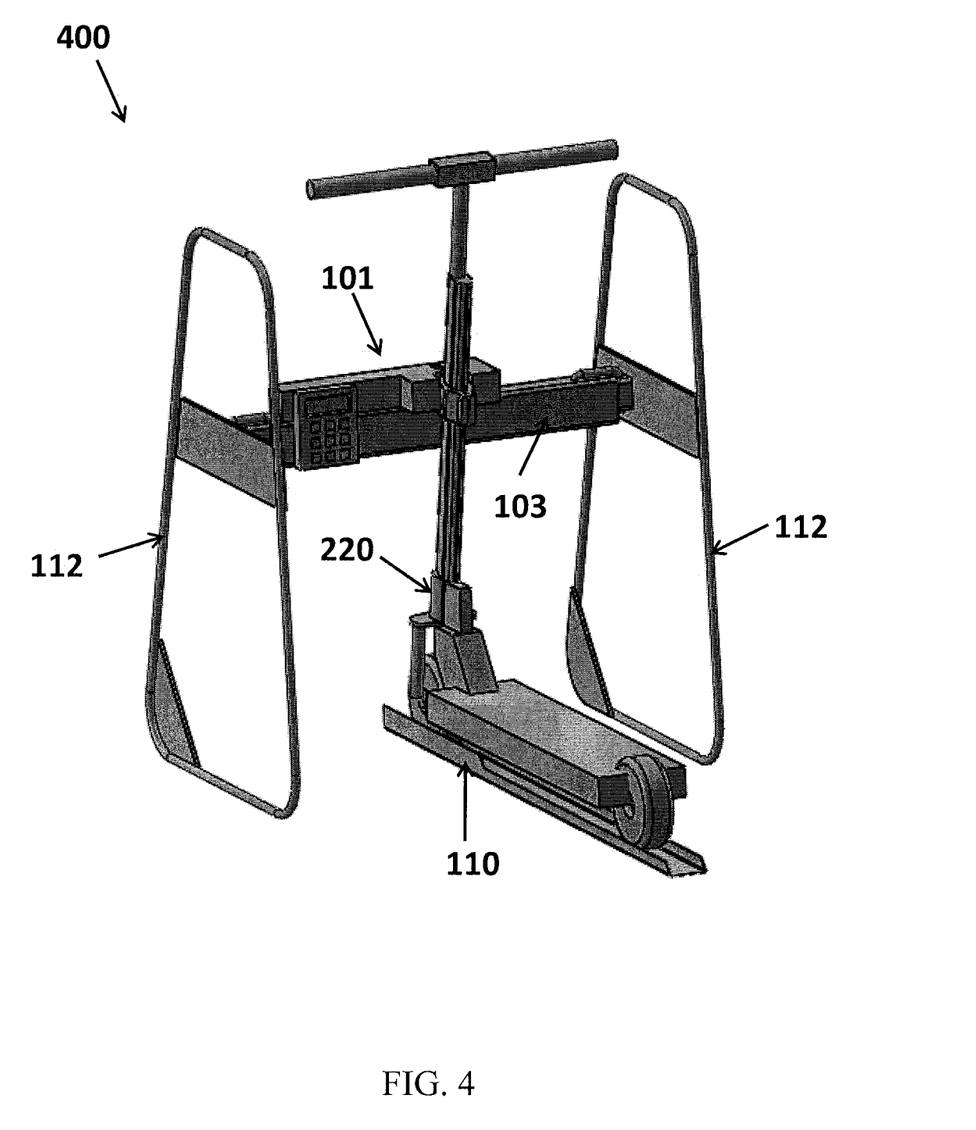

Individual bays made up of digital locking units can be configured in many different ways to form a recharging hub according to different embodiments—for example, a recharging hub may comprise one, two, three, or more digital locking units, which may be in a row, or otherwise, supported by a wide variety of structural members. In FIG. 3 an LEV is shown docked at a recharging hub 300 comprising a single digital locking unit 101, wherein the digital locking unit is supported by free standing vertical support members 111 attached to the modular structural member 103 on either side of the vehicle charge adapter 106. In FIG. 4 an LEV is shown docked at a recharging hub 400 comprising a single digital locking unit 101, wherein the digital locking unit is supported by free standing vertical support members 112 attached to the modular structural member 103 at either end; the LEV is also stabilized by a guide track 110.

In embodiments charging hubs are deployed across a defined area and set up to use whatever form of communication and power generation necessary for the location. Users of LEVs equipped with the appropriate charging adapters can approach a charging hub, select an unoccupied bay and engage the vehicle with the locking mechanism. By using the installed keypad or a wireless mobile device, the user can lock the vehicle and begin re-charging. When re-charging is complete the vehicle remains locked until digital permission to unlock the unit are granted by the user or owner. This process is conducted through custom software loaded in the electronics onboard the re-charging hub, a network server for the system of hubs, and on a user's mobile device. The software can be used to locate other re-charging hubs and reserve a re-charging location.

Figure 5:
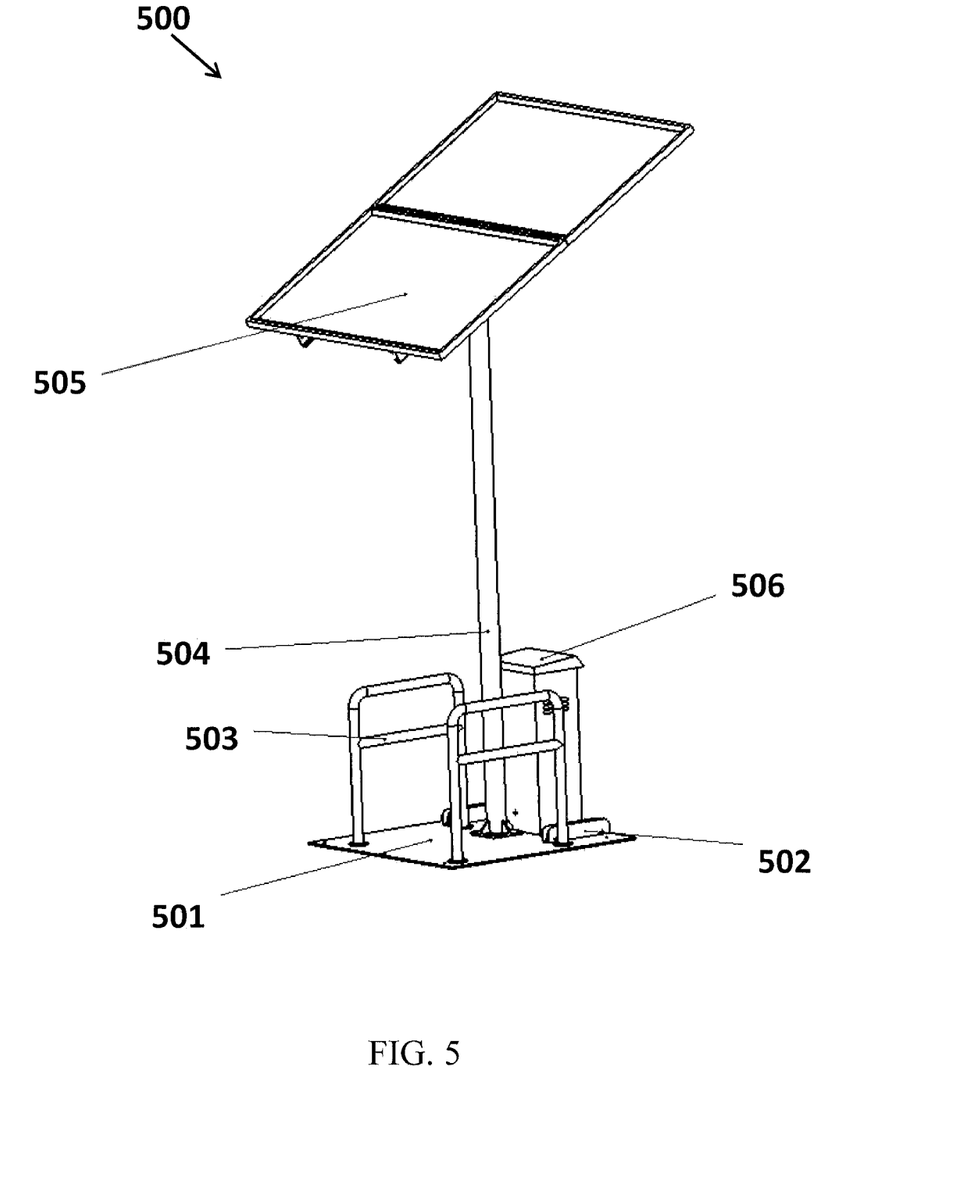
FIG. 5 shows a perspective view of a locking re-charging hub with a solar array, according to some embodiments of the present invention.

Individual digital locking unit units can be combined to form racks of charging bays that can be deployed in almost any location. These autonomous charging hubs (LURCHes) need to be powered by either local line power or can use locally generated/stored energy. For example, a solar array may be used to generate the power needed for recharging LEVs, as shown in FIG. 5. FIG. 5 shows a perspective view of a re-charging hub with a solar array, according to some embodiments of the present invention. The re-charging hub comprises a base plate 501, a wheel track 502, a locking post 503, to which one or more digital locking units 101 can be embedded and concealed (for simplicity of mechanical illustration details of the digital locking units are not shown in the figure, although digital locking units may be configured as shown in FIGS. 1-4, for example), a vertical support post 504 for the solar panel array 505, and a weatherproof enclosure 506. Many accessories can be used with the invention to gain added functionality for charging devices other than LEVs. Furthermore, standard non-electric vehicles and devices can also use the locking and charging capabilities.

Figure 6:
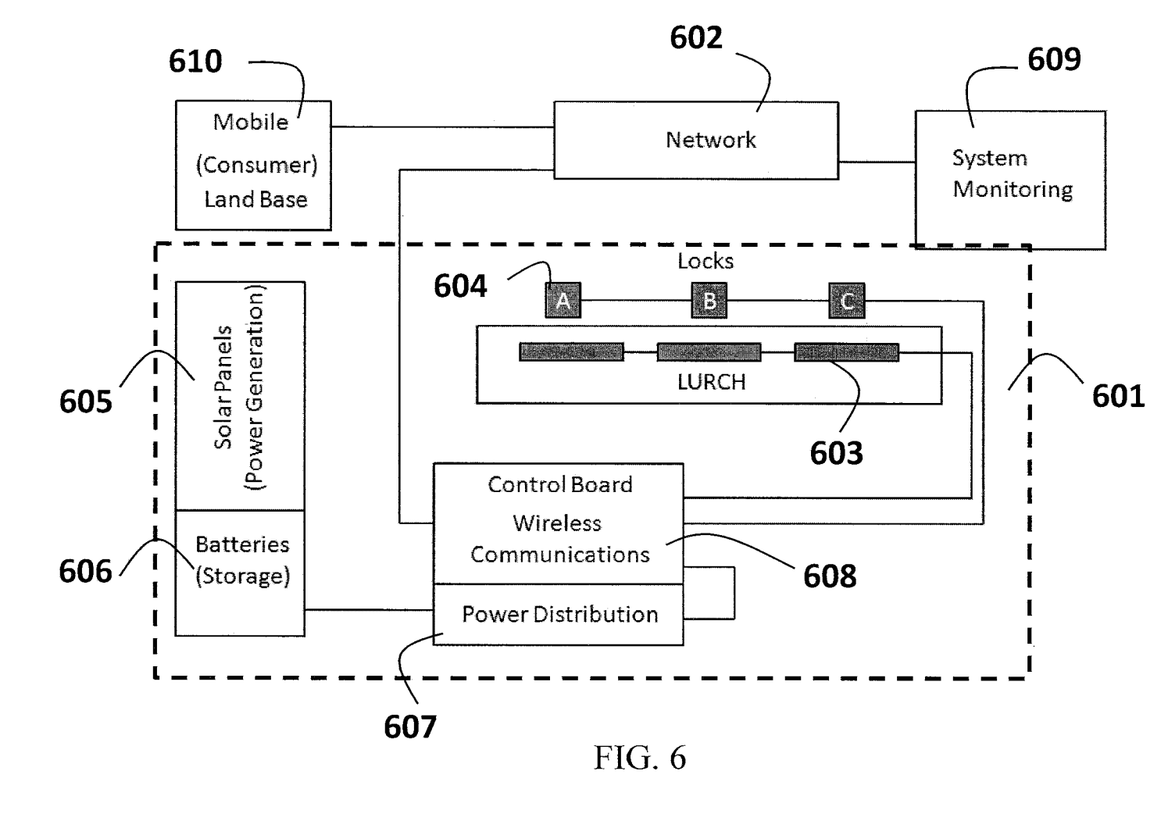
FIG. 6 shows a block diagram representation of an autonomous charging hub network, according to some embodiments of the present invention.

FIG. 6 shows a block diagram representation of an autonomous charging hub 601 linked to a network 602, according to some embodiments of the present invention. The hub (LURCH) 601 comprises, in this particular example, three docking bays 603, each with a corresponding digital lock 604, a power source which in this example is a solar panel array 605 connected to batteries 606, a power distribution unit 607 and control board/controller 608 with wireless communications. The controller monitors the charge level of the batteries in any BEVs docked at the hub, providing current to vehicles that need recharging. The controller is connected to the network 602 to enable sending to, and receipt of data from, a system monitoring application 609 running on a system server, and also to enable communication with a user by the use of an application running on a smart wireless mobile device or Internet connected computer 610. The controller, which monitors the charge level of the batteries in any BEVs docked at the hub, also sends notifications to the system monitoring on the server regarding the charge level of the docked BEVs.

The recharging hub of FIG. 6 may be used as follows; a user engages their LEV with the locking mechanism attached to the charging hub. Once in place, the user uses software on the network and the user's mobile device to exchange digital keys wirelessly and lock the vehicle. After locking, the re-charging hub re-charges the locked vehicle. When the charging is complete, the charging hub sends a message to the user (through the system network). When the user returns to the charging hub, the code or digital key is used to unlock the vehicle. The user can now leave the location of the charging hub with a fully charged LEV.

The autonomous locking/charging hubs described herein can be used in embodiments to enable new systems and methods for ride sharing of LEVs, such as electric bicycles.

Bicycles offer a unique opportunity to solve the first and last mile commute problem in that they are single user vehicles so there is maximum autonomy for personalizing the trip. Bicycles are also relatively compact to store and they are walkway and roadway friendly, meaning that they are accepted almost anywhere in cities, towns and even on public transportation. Bicycles require no special license and in most places no special equipment is needed to be in compliance with local laws. Bicycles costs, such as initial purchase and ongoing maintenance, are significantly lower than automobiles so a bicycle rental or rideshare business model could have much lower operational overhead costs which lowers user costs, a major barrier to widespread system adoption. Moreover, municipalities are actively adding more bike paths, designated bike routes and bike boulevards as traffic congestion grows worse in population dense regions.

In bicycle rental programs and share systems, the procedure for renting a vehicle uses either the "over-the-counter" rental model or a kiosk based rental model. For the over-the-counter rental model, the user goes into a store front and selects a bicycle, makes payment arrangements and ultimately returns the bike to the same store. Again, the user must arrange for transportation to and from the rental location before and after usage, so this model does not present a solution to the first and last mile problem. An alternative rental model that is gaining in popularity is the standard bike share model. In this rental model unattended racks of bikes with a rental kiosk are located close to public transportation hubs and around town in accessible centralized areas. This model serves public transit hubs well, as it offers an alternative to walking from the station provided that the user also has a satellite station to return the vehicle near their final destination. For this rental method to be maximally effective at solving the first and last mile problem, an extremely high density of installations is needed so that all users have a rental kiosk at their destination. For most users this is not a complete solution. Moreover, adoption of traditional bicycling as a commute alternative is low and will likely remain so due to the need for a significant amount of physical exertion while using a manual bike to travel distances further than a few hundred meters. In terrain that is not flat, the amount of exertion required may make this mode of commuting unusable for some individuals.

Another significant problem inherent with existing bike share models is the problem of system balance. An imbalance occurs when there are not enough bicycles at a station for the number of people wanting to rent them at that location. The problem is not that there aren't enough bikes in the system rather the problem is that the bikes are not at the location where the current demand is. This problem is not unique to bike share, as it is also an ever present issue in the traditional automobile rental business as well. An example of this balance problem in bike share systems occurs every day during the morning commute when commuters arrive at their destination station on a train and rent a bike to go from the train station to as close to their office as possible. After the first few commuter trains arrive, all of the rental bikes have departed the train station and are now parked at other stations away from the train. This problem of inventory flow management continues throughout the day as users move bikes throughout the system. In current rental models, there is no available method of reserving a bike in advance to guarantee it will be at a specific station at the time of need. While there is a real-time method to track where the inventory is in the system, there is no way to have a bike on demand if it is not already present at the station. Current rental models employ a fleet a trucks and cargo vans to continually move bikes throughout the day between stations to meet the demand. This method of rebalancing adds overhead cost to running the rental program and puts additional automobiles on the road to rebalance inventory in the areas where the bike share system aims to reduce the number of automobiles contributing to congestion on the roads.

Without a reasonable certainty that a vehicle will be available, standard bike share is not a reliable first and last mile solution.

Embodiments of the present invention include methods and processes for incorporating BEVs into rental and ride share programs, as described in more detail herein. Furthermore, in embodiments the location of recharging stations is determined by the commute needs of the membership of the ride share program, also as described herein.

Figure 7:
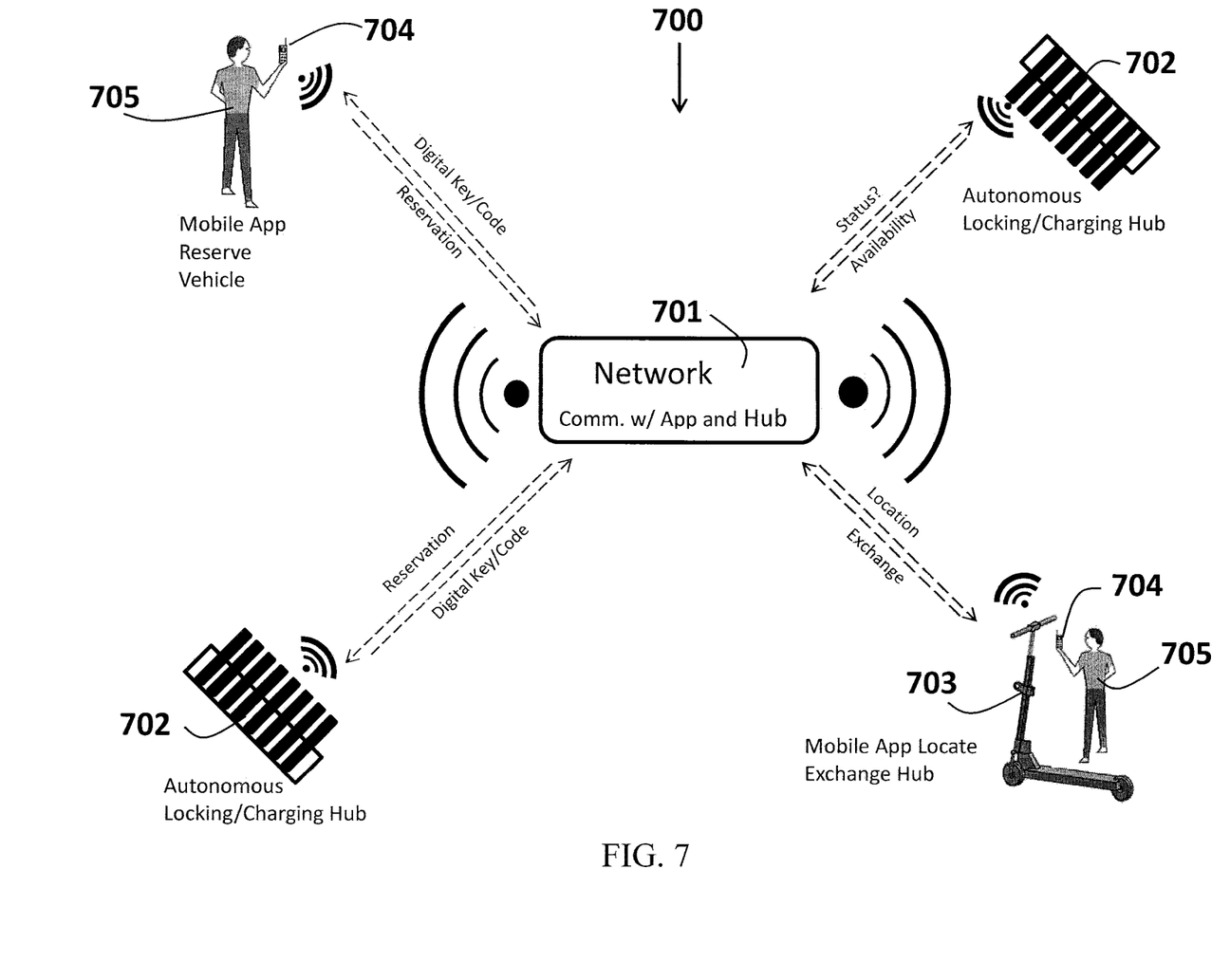
FIG. 7 shows a representation of an interconnected network and the use thereof for implementation of an electric vehicle share system, according to some embodiments of the present invention.

As shown in FIG. 7, an interconnected network system 700 comprises a networked server 701, autonomous locking-charging hubs 702, BEVs 703, and a smart wireless mobile device or Internet connected computer 704 with software application loaded thereon for the user 705. The networked server 701 is in continual communication with any number of autonomous locking-charging hubs 702. BEVs 703 remain locked and inaccessible while recharging at a hub 702. Using a mobile device 704 running a custom software application, individual users, renters or ride share participants can reserve a vehicle.

Also with reference to FIG. 7 a process for using the system may comprise:

(1) locating by the user of a first locking-charging hub (or alternatively selecting a vehicle) using the software application;

(2) selecting by the user of a vehicle (or if a vehicle was selected in (1), locating a first hub) using the software application;

(3) once a vehicle and location are selected, receiving a digital key or code by the user at their smart wireless mobile device or Internet connected computer;

(4) unlocking the selected vehicle with the digital key or code—this may be by wireless communication between the user's mobile device and the first locking-charging hub or by entering the code manually on an electronic keypad at the hub;

(5) removing the vehicle from the first hub and using the vehicle;

(6) locating a second locking-charging hub (which may be the same as or different to the first hub);

(7) returning or exchanging the vehicle, or leaving the vehicle to recharge the vehicle battery, at the second hub;

(8) wherein the returning comprises securing the vehicle in a locked re-charging bay where the vehicle is recharged;

(9) when the vehicle re-charge is complete an automatic notification is sent to the system server by the control system of the second hub;

(10) the system server broadcasts the availability of the charged vehicle at the second hub.

Figure 8:
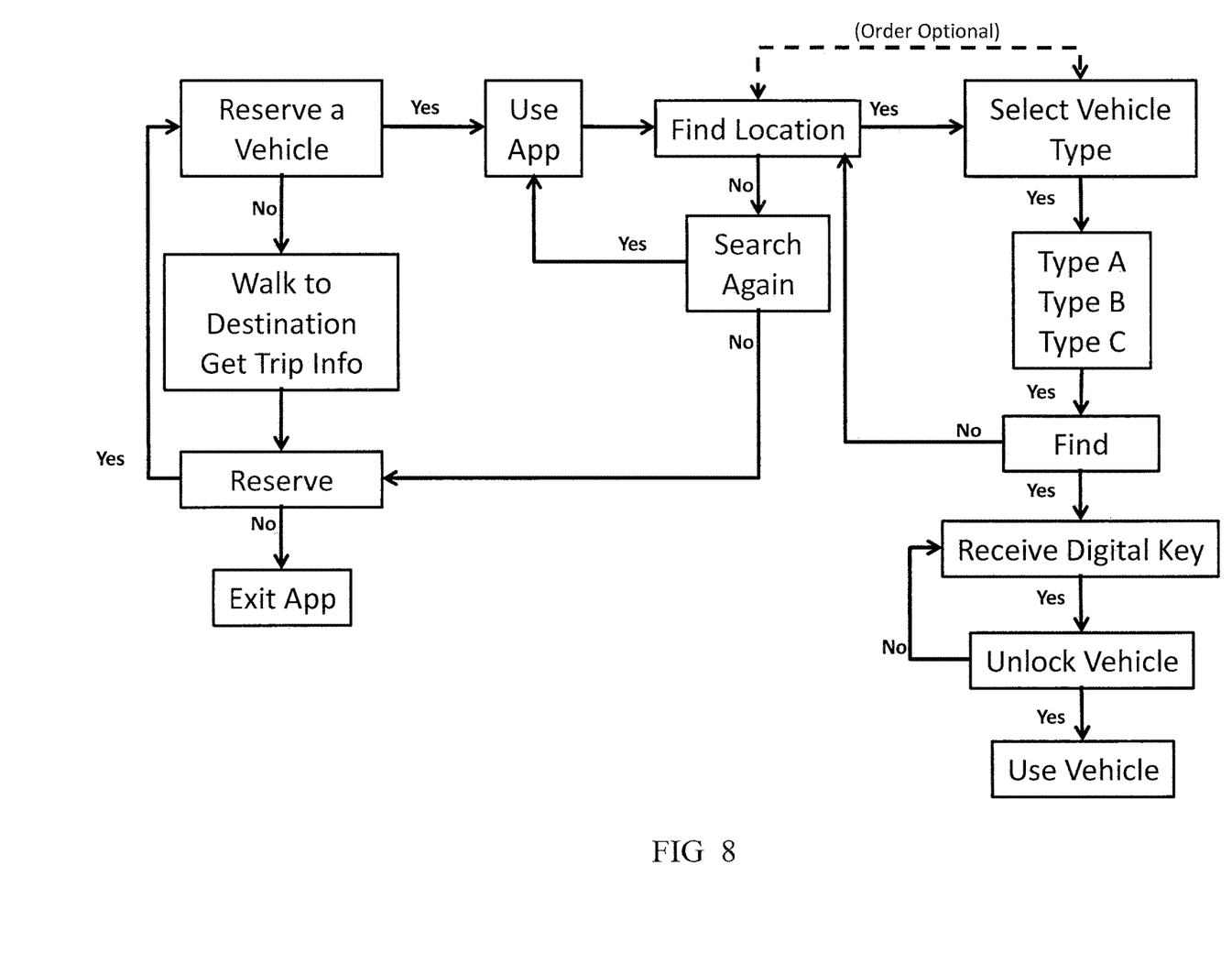
FIG. 8 shows logic gates and a decision tree as configured for vehicle reservations, according to some embodiments of the present invention.
Figure 9:
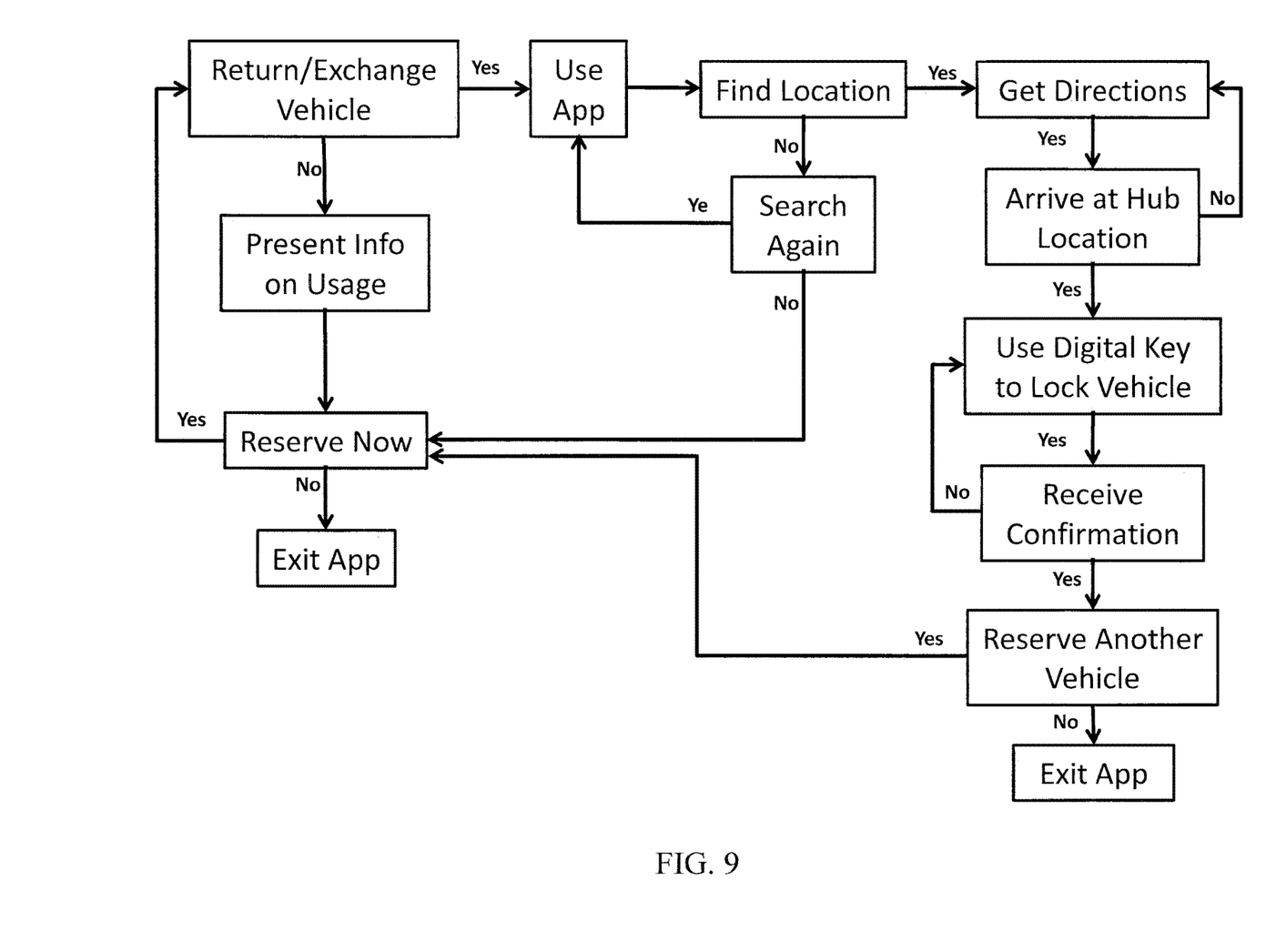
FIG. 9 shows logic gates and decision tree as configured for vehicle return or exchange, according to some embodiments of the present invention.

Logic gates and decision trees as configured in FIG. 8 can be used for vehicle reservations. Logic gates and decision tree as configured in FIG. 9 can be used for vehicle return or exchange.

According to embodiments of the invention large numbers of battery powered electric vehicles are placed in service, distributed across various automated locking charging hubs. A user is able to access the vehicle inventory list for all vehicles that are fully charged at each of the hub locations. From the list, the user can select a specific vehicle to reserve for use. Upon making a vehicle selection, a digital key is passed to the user through a wireless network link. Once the key is received, the user can unlock the vehicle at the chosen location and begin use. When use is completed, or the vehicle's charge is low, the user can locate the most convenient locking charging hub location using the software application and return the vehicle by docking and locking it in an unoccupied bay on the locking charging hub. Charging begins automatically and the vehicle remains locked until charging is complete and a request for use is validated with a digital key. Once locked, the user can tell the server that the vehicle has been returned and either no other action is needed or another vehicle is needed, whereby the user is able to use the software to select another vehicle and continue with the check-out process again.

According to some embodiments a ride share system can comprise the following elements: a network server equipped with inventory management software and membership tracking software; a communication network between BEV users and the BEV docking hubs; locking charging hubs deployed where required by users, equipped with any form of power distribution or generation and communication links necessary for its location (examples of power generation methods include: solar, wind, fuel cell, gas generator or other types of kinetic generation); BEVs, which can be adapted to participate in the locking and charging aspects of the invention with the addition of a custom adapter to mate with the custom locking charging hub; and custom software installed on computers or wireless mobile devices which allows users to access the rental or ride share networks and reserve, return or exchange a participating vehicle and transfer digital keys and codes.

In some embodiments the ride share system uses wireless communications and charging hubs that generate their own power. Furthermore, some embodiments use standard line power connected to the hubs for charging and can be connected to the server using land based "wired" connections. Furthermore, in some embodiments BEVs can be replaced with any type of battery powered device, such as drones, robots, cordless electric tools, telecommunication devices, lights, cameras, audio devices, appliances, cooking devices, heaters, etc. Furthermore, use of the system of the present invention may in embodiments be extended to include recharging and sharing of any battery power tool or device.

Some embodiments of the present invention change the rental model, making it specific to the needs of first and last mile commutes and travel. Some embodiments of the ride share system and method of the present invention can be used by companies, universities, resorts, municipalities, high density housing communities and individuals as an alternative to existing first and last mile solutions such as car rentals or car share, shuttles buses, taxi services, existing bike share programs, and walking. To begin with a company, for example, would invite employees to join the LEV ride share program and become eBike share members. For each employee enrolled, an eBike dock is located at the company to park the eBike during working hours. For each leg of an enrolled employee's commute, an additional LEV (eBike) and eBike dock will be added to the system. There is no assignment of a specific eBike to an individual, rather all of the eBikes are shared between all of the company's members. Here follow some examples of how the ride share system and method works for different types of commute.

The case of Company X, located in a suburban setting within a few miles from a train station used by many of its workers during their daily commute. Many of the company's employees live in the surrounding communities and others live further from the company, but within several miles of a mass transit hub.

Figure 10:
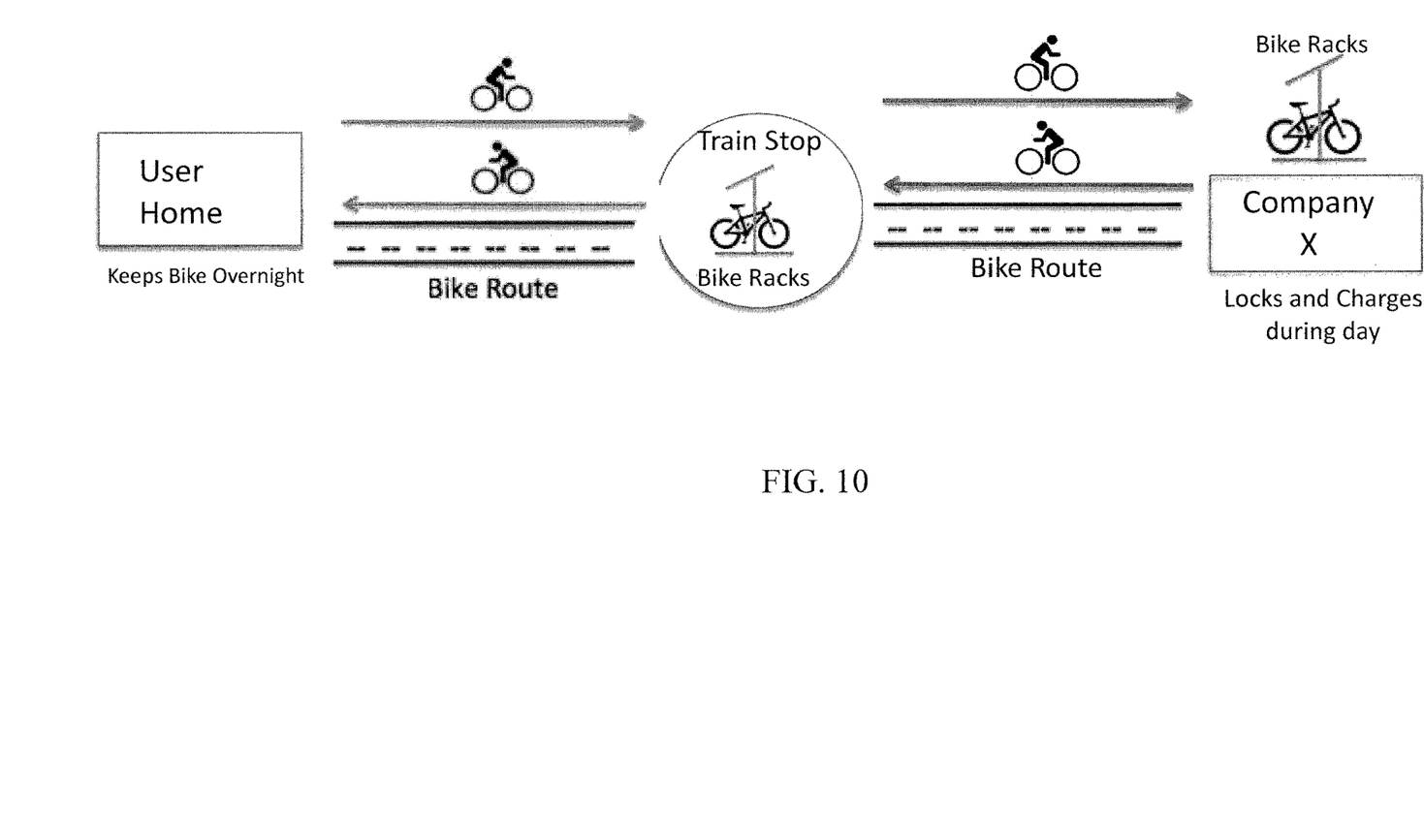
FIG. 10 shows a representation of a customized route specific bicycle rental, including keeping the bicycle overnight, according to some embodiments of the present invention.

To use the system an employee who lives in a city and commutes to Company X by train would do the following:
 1. Use the mobile app to reserve an eBike at the company;
 2. Go to the eBike dock at the company and use Smartphone to unlock;
 3. Use eBike to commute to transit hub;
 4. Take eBike on mass transit vehicle (Bus, train, ferry, etc.)
 5. Arrive at transit destination;
 6. Ride eBike home;
 7. Keep eBike in safe place overnight;
 8. Use eBike to commute to mass transit hub (train);
 9. Take eBike on mass transit vehicle (Bus, train, ferry, etc.)
 10. Arrive at transit destination;
 11. Use eBike to commute to company;
 12. Arrive at company and put eBike in dock.
This example of use of the system is illustrated in FIG. 10.

An employee who lives in a neighboring community and does not need to use mass transit as part of their daily commute to Company X would use the system as follows:
 1. Use the mobile app to reserve an eBike at the company;
 2. Go to the eBike dock at the company and use Smartphone to unlock;
 3. Use eBike to commute directly home;
 4. Keep eBike in safe place overnight;
 5. Use eBike to commute to company;
 6. Arrive at company and put eBike in dock.

An employee who lives a great distance away and needs to make multiple mass transit interconnects as part of their daily commute to Company X would use the system as follows:
 1. Use the mobile app to reserve an eBike at the company;
 2. Go to the eBike dock at the company and use Smartphone to unlock;
 3. Use eBike to commute to transit hub;
 4. Park eBike in eBike dock at transit hub;
 5. Take mass transit to next destination;
 6. Use the mobile app to reserve an eBike at interconnecting transit hub;
 7. Arrive at transit destination;
 8. Go to the eBike dock at the transit hub and use Smartphone to unlock;
 9. Ride eBike home;
 10. Keep eBike in safe place overnight;
 11. Use eBike to commute to mass transit hub;
 12. Park eBike in eBike dock at transit hub;
 13. Take mass transit to next destination;
 14. Arrive at transit destination;
 15. Go to the eBike dock at the transit hub and use Smartphone to unlock;
 16. Use eBike to commute to company;
 17. Arrive at company and put eBike in dock.

The case of Company Y, located in a big city setting within a few miles of most types of mass transit used by many of its workers during their daily commute. Many of the company's employees live in the surrounding communities and neighborhoods.

To use the system an employee who lives in the city and does not need to use mass transit as part of their daily commute to Company Y would use the system as follows:
 1. Use the mobile app to reserve an eBike at the company;
 2. Go to the eBike dock at the company and use Smartphone to unlock;
 3. Use eBike to commute directly home;
 4. Keep eBike in safe place overnight;
 5. Use eBike to commute to company;
 6. Arrive at company and put eBike in dock.

An employee who lives in a suburb and commutes to Company Y in the big city and by train would do the following:
 1. Use the mobile app to reserve an eBike at the company;
 2. Go to the eBike dock at the company and use Smartphone to unlock;
 3. Use eBike to commute to transit hub;

4. Take eBike on mass transit vehicle (Bus, train, ferry, etc.);
5. Arrive at transit destination;
6. Ride eBike home;
7. Keep eBike in safe place overnight;
8. Use eBike to commute to mass transit hub (train);
9. Take eBike on mass transit vehicle (Bus, train, ferry, etc.);
10. Arrive at transit destination;
11. Use eBike to commute to company;
12. Arrive at company and put eBike in dock.

An employee who lives a great distance away from the big city and needs to make multiple mass transit interconnects as part of their daily commute to Company Y would use the system as follows:

1. Use the mobile app to reserve an eBike at the company;
2. Go to the eBike dock at the company and use Smartphone to unlock;
3. Use eBike to commute to transit hub;
4. Park eBike in eBike dock at transit hub;
5. Take mass transit to next destination;
6. Use the mobile app to reserve an eBike at interconnecting transit hub;
7. Arrive at transit destination;
8. Go to the eBike dock at the transit hub and use Smartphone to unlock;
9. Ride eBike home;
10. Keep eBike in safe place overnight;
11. Use eBike to commute to mass transit hub;
12. Park eBike in eBike dock at transit hub;
13. Take mass transit to next destination;
14. Arrive at transit destination;
15. Go to the eBike dock at the transit hub and use Smartphone to unlock;
16. Use eBike to commute to company;
17. Arrive at company and put eBike in dock.

Membership in the ride share system enables users to enter information about their intended daily commute such as start destination, interconnecting mass transit routes, and commute days and times so that their route can be customized. Stations can be added upon request, if it serves to shorten the commute time for a particular route. Each eBike (LEV) used in the system is fully electric, offering exertion free travel in various combinations of boost assist and full throttle to ensure that the commute is as effortless as desired, even up hills. The electric motor controller can be set to limit the top speed to maintain compliance with local laws. Each eBike is equipped with a tracking system complete with accelerometer, GPS, and cellular communications as well as a full array of diagnostic and environmental sensors. The cellular link provides two way real-time machine-to-machine capabilities. The system makes use of all of the collected data to optimize and manage the trips. In the case where multiple commute interconnects are needed on a regular basis, the individualized commute itinerary can be saved and all of the reservations can be made automatically. The system will tie into all publically broadcasted mass transit schedules where available and will sync and update in real time, accounting for delays and changes. Also available to the users are multiple layers of mapping services such as locations of restaurants, local sites, bike trails, parks, transit hubs, topographical data, charging stations, etc.

The ride share models according to some embodiments described herein allow for tight control and monitoring of inventory. Individual eBikes are always in the correct position by design. The system uses a rule based approach to manage the inventory flow. An example of this is after a morning commute, most eBikes are located at Company X, brought there by an employee member as the final destination of their commute. Another member who did not use an eBike to commute on this same day can use this or other such eBikes to exercise or go to lunch during the day, provided they bring it back to the company. The only way they can use the bike is if they agree to a round trip rule for them on that day, requiring return by a specified time. In the event that a standing reservation is released, this eBike will become available for an unplanned overnight commute to and from the company. Any eBike can be prevented from being used if it is not sufficiently charged. The sequestration of the vehicle during charging and the ability to release it for use based on rules around charge state and destination are features of some embodiments of the ride share system.

The method of generating revenue may be rule based as well. The day can be divided into parts such as commute hours, working hours, lunch and afternoon hours, and off hours, all with potentially different rates. Based on usage during different times of day, total daily cost can be calculated.

By using a rule based approach, commute times can be customized to an individual member's work schedule. The system can become as individualized as a member wants. The company, hotel, resort, etc. can uses administrative cloud based tools to manage and have visibility into their particular installation. They can manage many of the rules and can activate rules to establish geofencing around the perimeter of a corporate campus or on defined routes between buildings. Using the rules, eBikes can be disabled and remotely locked for theft prevention. The system also makes use of a super administrative level of control to oversee the entire network of installations and users. Also built into the system is the ability for a user to report problems or trigger alerts for users and system operators.

To deal with any dislocation or imbalance in the system a number of methods can be employed. If an eBike is removed from service for maintenance reasons, it can be replaced at the same time. This is done by a service team dispatched from a nearby service center. eBikes can be delivered by trucks or vans, or where possible by eBikes pulling trailers that hold additional eBikes. Using this method, even service vehicles performing rebalancing activities and maintenance calls can remain off the roads and not contribute to congestion. Vehicles removed from the system after being in service for a defined period of time can be refurbished and resold in a secondary market.

Although embodiments of the present disclosure have been particularly described with reference to LEVs such as electric bicycles, electric scooters and two-wheeled self-balancing battery-powered vehicles, some embodiments of the present invention allow for wide scale adoption of BEVs generally for myriad uses, and more specifically for use in vehicle sharing networks and programs or businesses which provide electric format vehicles, such as automobiles, watercraft, carts, motorcycles, bicycles, tricycles, scooters, skateboards, and unicycles to individuals or groups for personal or common use. Some embodiments of the present invention facilitate these vehicle sharing networks and programs or businesses which provide electric format vehicles, for example by autonomously managing wide scale deployments of BEVs, and by providing everything needed to share, rent, exchange, lock and recharge BEVs including broadcasts and controls over the availability status of BEVs when charging is complete.

Although embodiments of the present disclosure have been particularly described with reference to certain embodi-

What is claimed is:

1. A recharging hub for battery electric vehicles (BEVs), comprising:
   one or more recharging bays, wherein each of said bays is configured for securing and recharging one of said BEVs, each of said bays comprising:
      a BEV charging adaptor, configured to make electrical connection between a rechargeable battery of said one of said BEVs and an electrical power supply of said recharging bay; and
      a smart lock housing for securing said one of said BEVs to said recharging bay;
   wherein said recharging hub is configured to (a) sequester a BEV during charging to prevent use of the BEV based on a charge level of the BEV and (b) release said BEV for use according to one or more rules based on trip information, commute times, geofencing, or any combination thereof, the one or more rules for the releasing of the BEV being applied based on information associated with a user requesting to rent the BEV, the information including at least a commute schedule associated with the user.

2. The recharging hub of claim 1, wherein said BEVs are light electric vehicles (LEVs).

3. The recharging hub of claim 2, wherein said LEVs are electric bicycles.

4. The recharging hub of claim 1, wherein said one or more recharging bays further comprises an electronic keypad for entry of a security code for opening of said smart lock housing.

5. The recharging hub of claim 1, wherein said one or more recharging bays further comprises a modular structural member comprising a modular locking pin, said modular locking pin being configured to securely attach two modular structural members, said BEV charging adaptor and said smart lock being attached to said modular structural member.

6. The recharging hub of claim 1, wherein said electrical power supply is a battery connected to and recharged by a solar panel array.

7. The recharging hub of claim 1, further comprising a controller configured to control recharging of and monitor the charge level of said rechargeable batteries of said BEVs.

8. The recharging hub of claim 1, further comprising a wireless communication link for communication with a system server for managing an inventory of said BEVs.

9. The recharging hub of claim 1, further comprising a wireless communication link for communication with a system server for monitoring the charge level of said BEVs.

10. The recharging hub of claim 1, further comprising a wireless communication link for communication with a smart wireless mobile device of the user of said recharging hub.

11. The recharging hub of claim 2, wherein said LEVs are electric scooters.

* * * * *